United States Patent [19]

Hanson

[11] 4,060,996
[45] Dec. 6, 1977

[54] VUILLEUMIER CYCLE THERMAL COMPRESSOR AIR CONDITIONER SYSTEM

[75] Inventor: Charles M. Hanson, Springfield, Va.

[73] Assignee: The United States of America as represented by the Secretary of the Army, Washington, D.C.

[21] Appl. No.: 751,295

[22] Filed: Dec. 16, 1976

[51] Int. Cl.² ............................................. F25B 9/00
[52] U.S. Cl. .................................... 62/6; 60/618; 62/238; 62/243; 62/323
[58] Field of Search .................. 62/6, 238, 243, 323; 60/616, 618

[56] References Cited

U.S. PATENT DOCUMENTS

| 3,716,988 | 2/1973 | Wurm | 62/6 |
|---|---|---|---|
| 3,892,102 | 7/1975 | Leo | 62/6 |
| 3,913,339 | 10/1975 | Berry | 62/6 |
| 3,991,585 | 11/1976 | Mulder | 62/6 |
| 3,991,586 | 11/1976 | Acord | 62/6 |
| 4,024,727 | 5/1977 | Berry et al. | 62/6 |

Primary Examiner—Ronald C. Capossela
Attorney, Agent, or Firm—Nathan Edelberg; Max L. Harwell; Robert P. Gibson

[57] ABSTRACT

A system that samples and uses heat from a hot exhaust as a source of heat to the hot side of a Vuilleumier compressor is driven by some external rotational input means to overcome the friction of a regenerator matrix containing hot displacer and cause reciprocal movement of the hot displacer. The Vuilleumier compressor produces alternating pressure waves that are applied to a cold finger array of free-displacer refrigerators wherein air is passed over the cold ends of each of the cold fingers to cool or refrigerate some desired area and heat is removed from the hot ends of the cold fingers and exhausted in another direction.

4 Claims, 3 Drawing Figures

VUILLEUMIER CYCLE THERMAL COMPRESSOR AIR CONDITIONER SYSTEM

The invention described herein may be manufactured, used and licensed by the U.S. Government for governmental purposes without the payment of any royalties thereon.

BACKGROUND AND SUMMARY OF THE INVENTION

This invention is generally in the field of extracting and using waste heat from some heat source, such as an internal combustion engine hot exhaust pipe or the hot stack of some manufacturing plant, to provide power for air conditioning some enclosed space. The invention is specifically comprised of a system wherein heat is extracted from the hot exhaust or stack and is used as a heat source for the hot volume in the hot cylinder of a Vuilleumier refrigerator, i.e. a thermal compressor air conditioner.

One main advantage of the present invention over prior art air conditioning devices using mechanical power from the internal combustion engine or electrical power from an engine driven generator is that the only power used is the waste heat and some rotational input device, such as an automobile belt driven shaft, having a small amount of mechanical power that is sufficient to overcome friction in driving the hot displacer containing a regenerator matrix therein.

The system of the present invention, therefore, has the hot volume at one end of a hot-side cylinder and a rotational input device that reciprocally moves the hot displacer within the hot-side cylinder as explained above. The rotational input device drives a crankshaft in a crankcase volume opposite the hot volume wherein a displacer rod is mechanically connected between an outer point, such as an impulse plate, on the crankshaft and the displacer. A hollow pressure line is connected between the crankcase volume and a plurality of free-displacer regenerator matrix refrigerators in a cold finger array. The amount of the crankcase volume is minimized for better efficiency in providing alternating pressure waves through the hollow pressure lines to the plurality of free-displacer refrigerators. The high portion of the pressure wave in the pressure line is when the displacer is the farthest into the crankcase volume because there is more hot volume at this time. Conversely, the low portion of the pressure wave occurs after the displacer has moved by the up stroke to the farthest point into the hot volume thus extracting heat from the hot volume during the up stroke and establishing a cooler temperature of the fluid medium, and thus a lesser pressure, now in the pressure line.

These alternating high and low pressure waves are applied to a plurality of free-displacer regenerator matrix refrigerators within a cold finger matrix as is explained herein below. The hot ends and the cold ends of the cold finger matrix are insulated from each other and are in separate hot and cold air ducts respectively so that heat removed from the vicinity of the cold ends is swept out the hot air duct. The average pressure in the pneumatic volumes of the free-displacer refrigerators is about equal to the average pressure in the working volume caused by the alternating pressure waves from the Vuilleumier compressor. However, as the working fluid pressure in the working volume, which is common to all of the free-displacer refrigerators, increases past the average in the pneumatic volume sufficient to move the free-displacers, the free-displacers move toward the ambient volume. The resultant expansion of the cold volumes at the cold ends at high working fluid pressure produces cooling in the cold volumes and an equal amount of heating in the ambient volumes. The low working fluid pressure half of the pressure waves from the Vuilleumier compressor creates a lower pressure than the average causing motion of the free displacer away from the pneumatic volume. The cold volume is, therefore, decreased and thus heated, but to a lesser amount than the heat removed during the expansion cycle. The result is net cooling of all the cold volumes. The cold volumes produce cooling in the cold air duct. Air circulated through the cold air duct by the fan may guide the cooled, air conditioned air to the desired inclosed space.

DETAILED DESCRIPTION OF THE PREFERRED EMBODIMENT

Figure 1:
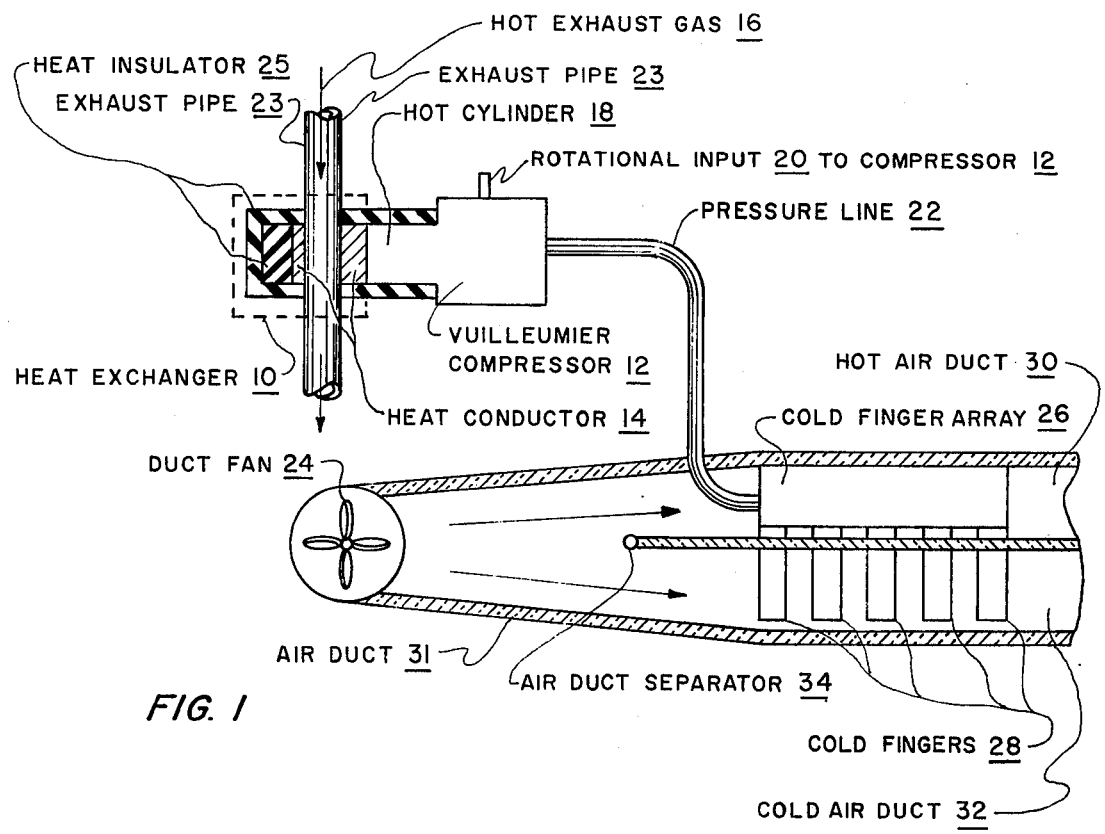
FIG. 1 illustrates a schematic of the Vuilleumier cycle terminal compressor air conditioner system of the present invention.
Figure 2:
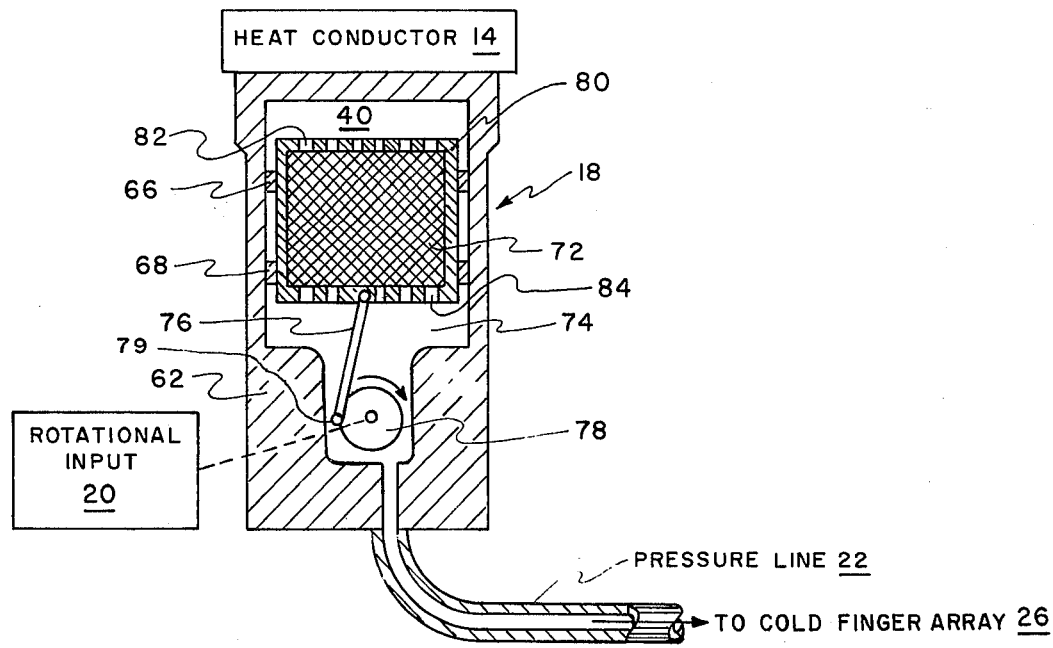
FIG. 2 shows a cross-sectional view of the Vuilleumier engine of the present invention.

Look now at FIGS. 1 and 2 for an explanation of the present invention Vuilleumier cycle thermal compressor air conditioner. The heat source for the hot side of the Vuilleumier compressor engine 12 is shown as being extracted from an exhaust pipe 23 having hot exhaust gas 16 moving therethrough. Heat is transferred from the exhaust pipe 23 to the hot side of engine 12 by a heat exchanger 10. Heat exchanger 10 is comprised of a mass of heat conductor 14, such as copper, that surrounds a portion of the exhaust pipe 23 and is also in intimate contact with the hot volume 40 at the hot cylinder 18 end of the Vuilleumier engine 12. Heat conductor 14 and the hot cylinder 18 are surrounded by some heat insulator material 25 which insulates 14 and 18 from ambient air temperature. The Vuilleumier engine 12 has a rotational input 20 that is applied to crankshaft 78, as shown in FIG. 2. Input 20 drives the hot displacer 80 reciprocally within hot cylinder 18 by imparting motion thereto by a displacer rod 76 connected to an outer point of crankshaft 78, which outer point may be an impulse plate connected to the crankshaft 78. Input 20 need only be powerful enough to impart enough mechanical energy to overcome all friction in reciprocally moving the hot cylinder displacer 80 to produce alternative pressure waves in pressure line 22.

Figure 3:
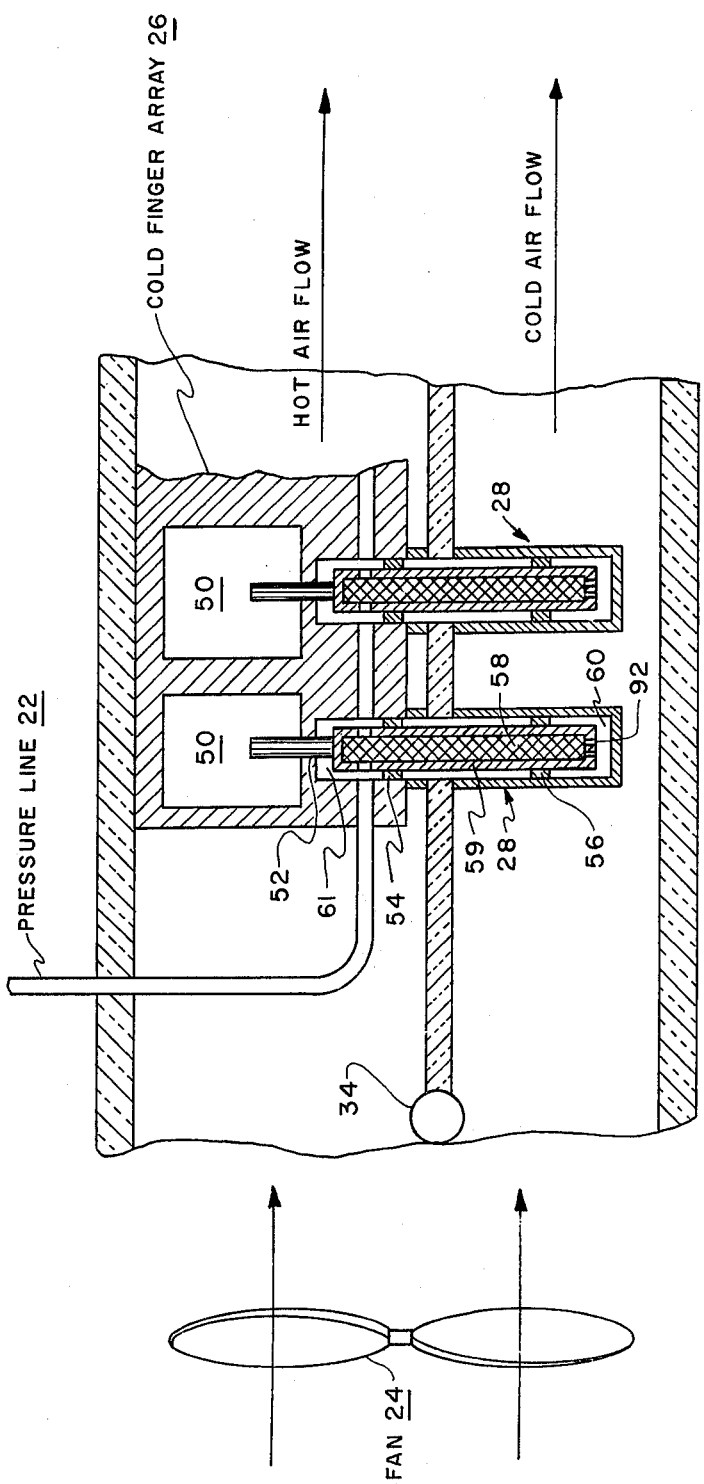
FIG. 3 illustrates in a partial-section view of the cold finger array of the present invention.

Refer now to FIGS. 1, 2, and 3 combined for a better understanding of the operation of the Vuilleumier cycle thermal compressor air conditioner of this invention. The alternating pressure waves that are produced by the Vuilleumier compressor 12 are transmitted through pressure line 22 to a plurality of common cavity ambient volumes 61 within a plurality of cold fingers 28 of cold finger array 26. These pressure waves impart reciprocal movement to a plurality of cold displacers 59 within each of the cold fingers 28 to produce cooling of the cold fingers as will be explained more fully herein below.

The particular embodiment of the Vuilleumier compressor 12 is shown in FIG. 2. Normally, a Vuilleumier refrigerator has as an input a hot cylinder having a hot displacer therein and has as an output a cold cylinder having a cold displacer therein. However, in the present invention the output is not a cold cylinder but is an alternating pressure wave caused by the alternate hot and cold temperatures created in the crankcase volume 74 by reciprocal movement of hot displacer 80. The alternating presssure waves are then applied through pressure line 22 to the plurality of free-displacers, or free cold displacers in a remote cold finger array 26.

These pressure waves are created by reciprocal movement of hot displacer 80, which is caused by the rotational input 20 rotating the crankshaft 78 having displacer rod 76 connected to the bottom side of displacer 80 and on the outer periphery of crankshaft 78. Seals 66 and 68 separate the hot volume 40 and crankcase volume 74. Working fluid within hot volume 40 is heated by heat from the hot exhause pipe 23 conductively communicating by heat conductor 14 with volume 40. The displacer regenerator matrix 72 is comprised of porous material with high heat capacity and low thermal conductivity, such as stainless steel screens or small metal spheres, and has a plurality of hot volume end ports 82 and a plurality of crankcase volume end ports 84 wherein working fluid may freely pass through in either direction. As volume 40 becomes hot the pressure within the working fluid volume, which is defined by the volumes of 40 and 74, pressure line 22, and ambient volumes 61 and cold volumes 60 of the plurality of cold fingers 28, increases to a maximum when displacer 80 is at the bottom of its stroke, i.e. the hot volume 40 is the greatest. That is because there is more of the hot volume 40 included in the total working fluid volume and the working fluid freely moves through regenerator matrix 72 to the remainder of the working volume. However, as hot displacer 80 moves upward toward the heat source, the regenerator matrix absorbs some heat from hot volume 40 and the pressure of the working fluid in the working volume is lowered due to the lowering of the average temperature of the working fluid. As displacer 80 is moved down again, the cooled working fluid is forced back through ports 84 into the regenerator matrix 72, where the working fluid regains the heat absorbed in matrix 72 during the previous half-cycle, and out through ports 82 into the hot volume 40. The average temperature of the working fluid again increases, and therefore the resulting working volume high pressure wave is transmitted by way of pressure line 22 to the plurality of ambient volumes 61 in the cold finger array 26.

Operation of the cold finger array 26 in the process of cooling is as follows. There is first established an average pressure in each the plurality of pneumatic volumes 50 that is about equal to the average pressure of the high and low pressure waves in the working volume, i.e. in the plurality of commonly connected ambient volumes 61. The explanation below will reference operation of only one of the cold fingers 28; however, all of the plurality of cold fingers operation the same. As the working fluid pressure increases past the average, a pressure difference occurs across the pneumatic piston 52, causing cold displacer 59 to move toward the pneumatic volume 50 due to the pressure wave freely flowing through the cold finger regenerator matrix 58 and out cold finger ports 92 to the cold volume 60. Seals 54 and 56 are used as guides for displacer 59 and also to guide the working volume pressure waves back and forth through the matrix 58. The resultant expansion of the cold volume 60 at high pressure causes cooling in cold volume 60 and an equal amount of heating in ambient volume 61. The second half of the complete cycle occurs when the pressure decreases below the average pressure, thus causing a reversal of free-displacer 59 movement, i.e. movement away from pneumatic volume 50. Cold volume 60 is therefore decreased at low pressure resulting in heating in the cold volume 60, but of a lesser amount than the heat removed during the first half-cycle, or high pressure wave cycle. An equal amount of cooling occurs in ambient volume 61 at the low pressure wave cycle. The result in a net amount of cooling in cold volume 60 and an equal amount of heating in the ambient volume 61.

A duct fan 24 enclosed in an air duct 31 forces air past an air duct separator 34 and through a hot air duct 30 and a cold air duct 32. The cold air duct encloses the cold half of the plurality of cold fingers 28, and the hot air duct encloses the remainder of the cold finger array 26. The cold air extracted from the cold half of the plurality of cold fingers 28 is vented by fan 24 into an enclosed area being air conditioned, such as the passenger compartment of an automobile, while the hot air is vented out to an open area. The hot air may be also vented into the enclosed area, such as a passenger compartment, while the cold air is vented out to an open area. Likewise, there may be a mixture of the hot and cold air vented to the enclosed area in some controlled manner and the remainder vented out to an open area. Also, temperature control may be directly controlled by varying the speed at which the rotational input 20 drives the Vuilleumier compressor 12 is driven. Further, the Vuilleumier compressor 12 may be used for purposes other than driving the free-displacer refrigerators, i.e. driving a conventional air conditioner or vacuum pump.

I claim:

1. A Vuilleumier cycle thermal compressor air conditioner system comprising:
   a hot exhaust heat source and heat exchanger in intimate contact with the hot volume of a Vuilleumier compressor hot cylinder,
   a rotational input device connected to a crankshaft in a crankcase volume that is on the opposite side of a regenerator matrix displacer from said hot volume, wherein a displacer rod is connected between said displacer and an outer point on said crankshaft to impart reciprocal motion to said regenerator matrix displacer and produce alternate high and low pressure waves corresponding to alternate hot and cold temperatures in said crankcase volume; and
   a cold finger array comprised of a plurality of free-displacer regenerator matrix refrigerators that are in communication with and are driven by said alternate high and low pressure waves, said refrigerators having a cold volume end position in a cold air duct and an ambient volume that is in direct communication with said pressure waves and a pneumatic volume positioned in a hot air duct wherein a duct fan vents air through said hot and cold air ducts to selectively air condition an enclosed space.

2. A Vuilleumier cycle thermal compressor air conditioner system comprising:
   a heat source and a heat exchanger;
   a Vuilleumier compressor having a hot cylinder comprised of a hot volume in intimate contact with said heat source through said heat exchanger, a crankcase volume, a hot displacer comprised of a regenerator matrix having a plurality of hot volume end ports and a plurality of crankcase volume end ports therein and a displacer rod connected between said hot displacer and an outer point of a crankshaft in said crankcase volume and a rotational input connected to said crankshaft for imparting reciprocal movement to said hot displacer to produce pressure waves in said crankcase volume;

a hollow pressure line in communication at one end to said crankcase volume;

a cold finger array comprised of a plurality of free-displacer regenerator matrix refrigerators wherein each of said refrigerators has a cold volume at a cold end and an ambient volume in communication with a second end of said hollow pressure line and a pneumatic volume separated by a pneumatic piston from said ambient volume at a hot end, said pneumatic piston is rigidly connected to one end of said free-displacer regenerator matrix through said ambient volume, wherein said hot end and cold end are insulated from each other and are respectively in a hot air duct and a cold air duct in which said pressure waves alternately reciprocate said free-displacer regenerator matrix for cooling said cold volume and said cold end; and a duct fan for venting air over the plurality of the hot and cold ends for selectively supplying hot or cold air conditioned air to an enclosed space.

3. A claim as set forth in claim 2 wherein said heat source is an internal combustion hot exhaust pipe.

4. A claim as set forth in claim 3 wherein said rotational input is from an automobile belt driven shaft connected to said Vuilleumier crankshaft.

* * * * *